March 1, 1966 A. LENDER 3,238,299

HIGH-SPEED DATA TRANSMISSION SYSTEM

Filed July 2, 1962 2 Sheets-Sheet 1

INVENTOR.

ADAM LENDER

BY

Lippincott, Ralls & Hendricson

ATTORNEYS

INVENTOR.
ADAM LENDER
BY
Lippincott, Ralls & Hendricson
ATTORNEYS

United States Patent Office 3,238,299
Patented Mar. 1, 1966

3,238,299
HIGH-SPEED DATA TRANSMISSION SYSTEM
Adam Lender, Palo Alto, Calif., assignor, by mesne assignments, to Automatic Electric Laboratories, Inc., Northlake, Ill., a corporation of Delaware
Filed July 2, 1962, Ser. No. 206,747
14 Claims. (Cl. 178—68)

This invention relates to apparatus for the electrical transmission of binary data over a communications channel of limited frequency bandwidth. More specifically, the invention provides a means of transmitting binary data at twice the bit rate previously believed maximum using a conventional binary method. In spite of this substantial increase in transmission rate, the original binary data can be unambiguously reconstructed from the signal at the receiving end.

It is well known in the art that the maximum transmission rate over a transmission channel of limited bandwidth is set by Nyquist's rule. For binary data, $C=2f$, where C is the maximum transmission rate in bits per second and $f$ is the frequency bandwidth limit of the system. All data communication systems have a frequency bandwidth limit. This sometimes arises in the sending equipment, the receiving equipment, the transmitting equipment, or the transmission medium. It is almost always desirable to transmit the most possible data in the available frequency bandwidth. A higher bit rate is possible with conventional systems if the data is coded in a number system with a base greater than 2. With quaternary data, for example, $C=4f$. Many communication systems, therefore, use the quaternary base in order to double the transmission rate. However, the resultant increase in transmission speed is paid for by concomitant disadvantages. First, quarternary systems are considerably more sensitive to noise. This causes a larger number of errors with a given noise level. Second, the complexity of the transmission equipment for a quaternary system is approximately doubled.

This invention provides new apparatus for a binary data communication system which permits a maximum transmission speed twice that heretofore though possible for binary data by Nyquist's rule. The maximum bit speed in this invention is therefore the same as previously possible only with a quaternary system. Yet the sensitivity to noise is 3.6 db less than in a quarternary system; and the complexity of the equipment required in a preferred embodiment of the invention is about the same as in a conventional binary system—about half that of a quaternary system. Additionally, the intersymbol interference is substantially less than that in a quaternary system.

Briefly, the apparatus of this invention includes a means for supplying to the transmission channel electric pulses representing binary data to be transmitted at a bit rate of up to about four times the frequency bandwidth limit of the transmission channel. Because the data waveform at such a high bit rate relative to the bandwidth of the transmission channel contains essential frequency components which the transmission channel is incapable of transmitting, the data waveform is not transmitted through the channel in its original form. Nevertheless, there will be a received signal from which the original data can be reconstructed, in accordance with this invention. The received signal has three detectable amplitude zones. These consist of two outer zones and an inner zone. The maximum change in signal amplitude during a one-bit time interval is from one of the three amplitude zones to an adjacent one of the three zones. Thus, the received signal is not ternary—a ternary signal also has three amplitude levels, but it can vary among any of the three during one pulse duration. Furthermore, the apparatus of the invention requires no special conversion apparatus to obtain the received signal. Such apparatus would be required if the data were converted from binary to ternary. In the receiving apparatus, according to this invention, means are provided for determining within which of the three amplitude zones the amplitude of the received signal lies, and for reconstructing the electric pulses representing the original binary data from the output of the detecting means. In a preferred embodiment of the invention, the detecting means must determine only whether the amplitude of the received signal is in the inner zone. From this one strictly binary decision, the data input waveform can be unambiguously reconstructed. In this preferred embodiment of the invention, there is no memory in the data detection and reconstruction apparatus. All binary decisions are based on a single pulse. This eliminates any multiplication of errors which results from a system which must make logical decisions based upon more than a single pulse.

Substantially any conventional carrier transmission or baseband equipment may be used. Specific examples of carrier systems include AM, FM, and phase-modulation. The apparatus of the invention may be applied to teletype systems to double the number of transmission channels while still using the same frequency bandwidth. Telemetry applications are also possible.

The invention may be better understood from the more detailed description which follows, referring to the drawings in which.

Figure 1:
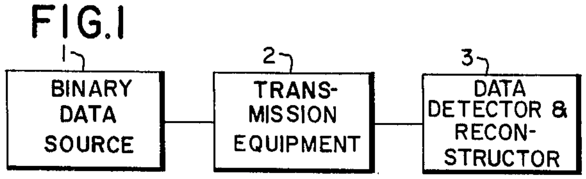
FIG. 1 is a block diagram of a data communication system incorporating apparatus embodying the invention.

Referring to FIG. 1, binary data is generated by a data source input 1. The data source used for the invention is conventional. However, the bit rate of the data entering the transmission equipment can be up to about four times the frequency bandwidth limit of the system. This rate is twice that previously possible for a conventional binary system, and is equal to that previously possible using a quaternary system. Somewhere in the transmission system there is invariably an inherent frequency bandwidth limitation. In baseband systems this may be in the transmission medium; in carrier-modulated systems, it usually occurs in the lowpass filter used for demodulation. With the apparatus of the invention, a reconstructable signal can be transmitted at a bit rate up to about four times this frequency bandwidth limit; although four is not an absolute limit, the error rate becomes too high above 4.5 times the bandwidth, for example. If the bit rate falls below about four times the bandwidth, a conventional lowpass filter is used. The cut-off frequency of the filter is about one-fourth the bit rate. Therefore the system of this invention is perfectly compatible for bit speeds below twice the frequency bandwidth limit as well as above that speed up to about four times the frequency bandwidth limit. In most applications, a maximum transmission speed is desirable. Therefore in practice the system of this invention is operated at its most desirable bit rate of about four times the frequency bandwidth limit.

The transmission equipment 2 is not a part of the invention. In the block 2 designated as transmission equipment, both the transmission medium and the linear carrier modulation equipment (if any) are included. This equipment is used to transmit the data pulses from the data source 1 to the data detector and reconstructor 3. The simplest baseband data transmission system, of course, is a cable. Cables have limited bandwith which fixes the maximum bit speed.

If desired, the data may be carrier-modulated. Because linear modulation systems are well known in the art, it is not necessary to go into them in detail here. Amplitude modulation, frequency modulation, phase modulation (either analog or coherent digital), or other methods of carrier modulation may be used. A specific example of one type of carrier modulation and transmission equipment, FM, is shown in FIG. 2.

Figure 2:
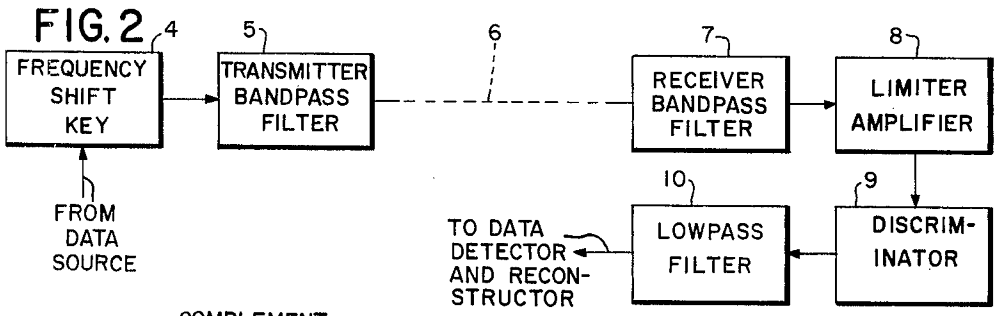
FIG. 2 is a block diagram of FM transmission apparatus.

Referring to FIG. 2, electric pulses from the data source enter the frequency shift key 4. The frequency shift key may be a single oscillator, keyed in a strictly binary manner by switching a fixed capacitor in or out. This shift key effectively shifts between two fixed frequencies according to whether the signal is in one or the other of the two binary states. These two binary states will be referred to as MARK and SPACE. The binary-keyed wave emitted from the frequency shift key 4 is applied to a transmitter bandpass filter 5. The signal from the transmitter bandpass filter 5 is sent across a transmission medium 6 (which may be a cable, H-F radio, etc.) to the receiver. The receiver bandpass filter 7, the limiter amplifier 8, the discriminator 9 and the low pass filter 10 perform linear demodulation. The wave shape of the pulse emitted from the lowpass filter 10 is the same as it would have been if there had been a cable with the same frequency bandwidth as the lowpass filter between the data source and the output of lowpass filter 10.

Figures 3, 4, 5:
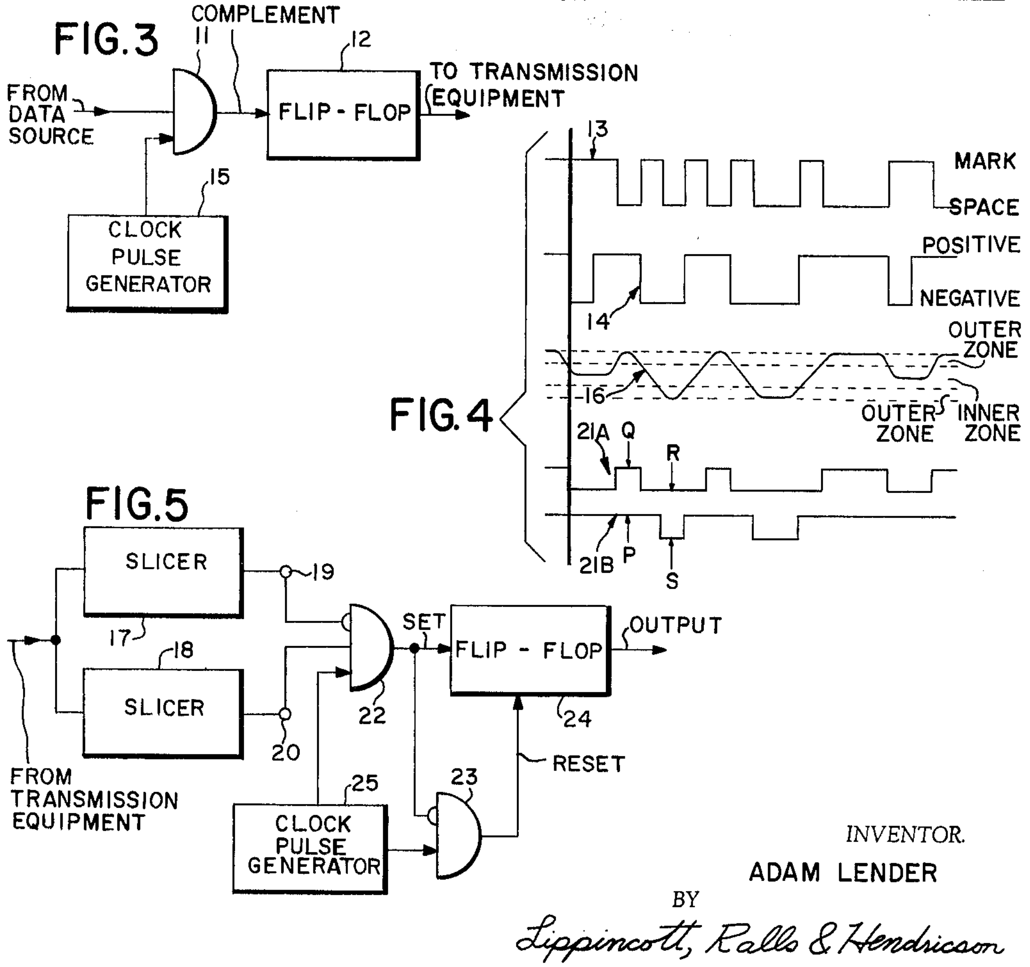
FIG. 3 is a block diagram of a conventional digital differentiator.
FIG. 4 shows a binary data waveform at various stages of the transmission using apparatus of a preferred embodiment of the invention.
FIG. 5 shows a data detector and reconstructor of a preferred embodiment of the invention.

In the preferred embodiment of the invention, the data waveform from the data source is passed through a digital differentiator before transmission. A typical digital differentiator block diagram is shown in FIG. 3. When a MARK appears from the data source, gate 11 has an output; otherwise it does not. An output of gate 11 complements flip-flop 12; as a result, flip-flop 12 changes state only when a MARK appears from the data source. The data waveform is converted from the waveform 13 shown in FIG. 4 to waveform 14. Waveform 14 emerging from flip-flop 12 has been digitally differentiated. It has been surprisingly discovered that the complexity of the required data detector and reconstructor can be greatly reduced if the data is first passed through a digital differentiator before transmission. Furthermore, a substantial increase in reliability is obtained when a digital differentiator is used. This will be explained later.

The use of a pulse synchronizing means, such as clock pulse generator 15 shown in FIG. 3 is conventional. The clock pulse generator is a synchronization recovery circuit set to generate pulses at fixed frequency equal to the bit rate. The clock pulses are phased with the signal using a conventional synchronization circuit. Clock pulse generators and synchronization circuits are described in Wier, J. M., Digital Data Communication Techniques, Proceedings of the IRE, vol. 49, January 1961, pp. 196–204.

The digitally differentiated pulse is transmitted in one of the ways described earlier. A data detector and reconstructor of the preferred embodiment of this invention is shown in FIG. 5. The waveform 16 shown in FIG. 4 is received from the transmission equipment. It has three amplitude zones: an inner zone and two outer zones, as shown. This configuration of the waveform 16 is inherently and directly produced from waveform 14 upon transmission of the latter over whatever transmission medium is employed. Whether the transmission medium is as shown in FIGURE 2 with the lowpass filter 10 at its output, is merely a cable, or is otherwise provided, the medium has a limited frequency bandwidth. As employed in accordance with the present invention, the upper frequency bandwidth limit of the transmission medium is about one-fourth the bit rate of data waveform 14. In other words, the bit rate is about twice that to which the limited bandwidth transmission medium is able to fully respond during the time of a single bit interval. The inherent impulsive response of the medium under these circumstances is such that two bit intervals of the same polarity of the waveform 14 following a bit interval of the opposite polarity are required to effect a departure in waveform 16 from one outer zone to the other or from the inner zone to one of the outer zones. When the waveform 16 is one of the outer zones as a result of prior bit intervals of a given first polarity and these prior bit intervals are followed by a bit interval of the opposite or second polarity, a transient is established which effects a change from the outer zone to the inner zone during this bit interval of second polarity. Now, if this bit interval of second polarity is followed by another bit interval of second polarity, the transient will be sustained and the variation of waveform 16 continues through the inner zone to the opposite outer zone. However, if the bit interval of second polarity is instead followed by a bit interval of the first polarity, the transient is cancelled while the waveform 16 is in the inner zone. The waveform 16, hence, remains in the inner zone during the bit interval of first polarity although a transient tends to be initiated in the opposite direction to that just described. This transient will be sustained by a successive bit interval of first polarity and cause the waveform 16 to revert to the original outer zone, but will be nullified by a successive bit interval of second polarity to thus cause the waveform to remain in the inner zone. The time intervals required for the foregoing changes in waveform 16 to occur and the configuration of the waveform in undergoing the changes are, of course, quite reproducible by virtue of the clock pulse governed constancy of the bit intervals of the waveform 14.

For the purposes of the present invention the inner zones of the waveform 16 is defined as the area between two slicing levels. For optimum accuracy of detection and reconstruction, the upper slicing level is set midway between the maximum and the center values of the amplitude of waveform 16. The lower slicing level is set midway between the minimum and the center values of the amplitude of waveform 16. Although the slicing levels may vary somewhat from optimum, the reliability of the detector and reconstructor is lessened as these levels depart from optimum.

Waveform 16 is passed through a pair of slicers 17 and 18 which are set at the desired slicing levels discussed above. The output waveforms from the slicers appear at points 19 and 20 (FIG. 5) and are shown in FIG. 4 as waveforms 21A and 21B. Each of these waveforms has two discrete amplitudes; one of these is a positive (or upper) amplitude—for example, amplitudes P and Q—and the other is a negative (or lower amplitude—for example, amplitudes R and S. When the amplitude of waveform 21A is negative and the amplitude of waveform 21B is positive, then the amplitude of waveform 16 lies in the inner zone. Conversely, if either the amplitude of waveform 21A is positive or the amplitude of waveform 21B is negative, then the amplitude of waveform 16 falls in one of the outer zones. The simplicity of the detection and reconstruction apparatus required is illustrated when waveform 16 is compared with the original data waveform 13. Whenever the amplitude of waveform 16 lies in the inner zone, there is a MARK in the corresponding portion of waveform 13; whenever the amplitude falls in the outer zone, there is a SPACE. Therefore the logical circuit shown in FIG. 5 must make only a single binary decision: is the amplitude within the inner zone? If not, it must be in the outer zone.

The actual binary decision is made by two AND-gates 22 and 23, a flip-flop 24, and a pulse synchronizing means such as clock pulse generator 25. The AND-gates used and described herein are all of the type having an output only when all inputs are positive. The first AND-gate 22 has an input connected through a conventional inhibitor (shown by its standard symbol on AND-gate 22) to slicer 17. An inhibitor inverts the binary state of the signal, changing it from positive to negative, and vice versa. AND-gate 22 has another input connected to slicer 18 and a third input connected to clock pulse generator 25. Its output is connected to the SET input of flip-flop 24. The other AND-gate 23 has an input connected through an inhibitor to the SET input of flip-flop 24. It has another input connected to clock pulse generator 25 and an output connected to the RESET input of flip-flop 24.

Clock pulse generator 25 serves both to generate clock pulses at a rate equal to the bit rate of the transmitted data and to synchronize these pulses, so that they will be in phase with the data pulses. The actual circuitry of the pulse generator and synchronizer is well known. A more detailed description can be found in the Wier reference mentioned earlier.

When the slicers indicate that the amplitude of waveform 16 falls in an outer zone, AND-gate 22 will have no output, but AND-gate 23 does (because of the inhibitor). Flip-flop 24 is then RESET, indicating a SPACE. When the slicers indicate, the amplitude of waveform 16 lies in the inner zone, the AND-gate 22 has an output. Flip-flop 24 is then SET, indicating a MARK. Thus the data detector and reconstructor of FIG. 5 detects the data from waveform 16 and directly reconstructs the data of waveform 13.

Except for having two slicers rather than one, the data detector and reconstructor of this preferred embodiment requires no more equipment than a conventional binary data detector and reconstructor, yet it can unambiguously reconstruct data transmitted at a rate twice that possible with the conventional binary system.

This preferred embodiment of the invention has other very important advantages. The data detector and reconstructor has no memory. Each binary decision is made strictly on the basis of a single pulse. Where decisions must be made on the basis of previous pulses, as well as the single pulse being detected, a multiplication of errors can result, i.e., an error from previous pulses is repeated. With the embodiment shown in FIG. 5, there is no such multiplication.

Another important advantage is obtained when the data detector and reconstructor of FIG. 5 is used with a phase-modulated carrier. In coherent phase modulation of digital data, the recovered reference carrier is sometimes reversed in transmission by 180°. This would result in the waveform 16 of FIG. 4 having peaks where there should be valleys, and vice versa. However, since both a peak and a valley are in an outer zone, it makes no difference if there is a phase reversal—the data detector and reconstructor will arrive at exactly the same result.

Figure 6:
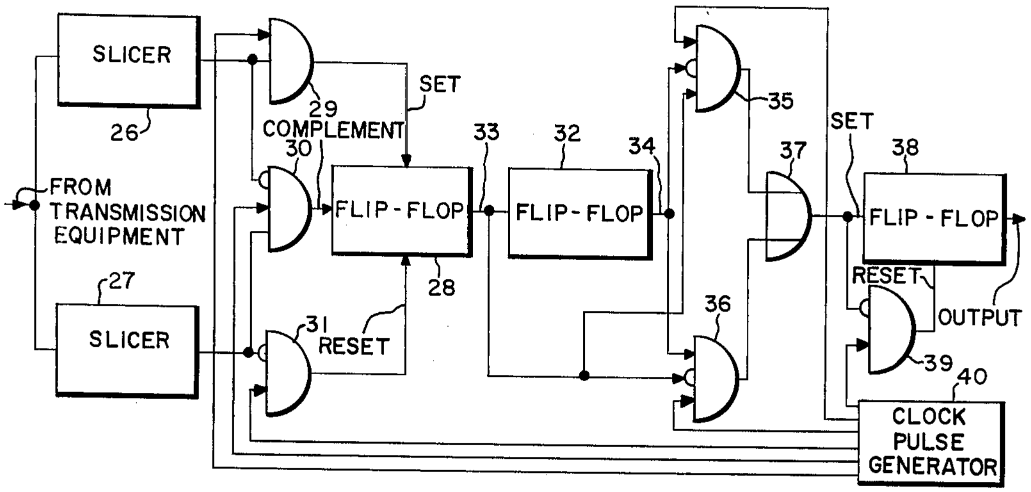
FIG. 6 is a block diagram of a data detector and reconstructor of another embodiment of the invention.

An alternate system, also using digitally-differentiated pulses, is shown in FIG. 6. The same data waveform 16 (FIG. 4) passes through the pair of slicers 26 and 27. The outputs of the slicers are the same as before, and are shown in waveforms 21A and 21B (FIG. 4). The first part of the data reconstructor of FIG. 6 between the slicer outputs and the output of flip-flop 28 is used to reconstruct waveform 14 (FIG. 4). When the slicers indicate that the amplitude of waveform 16 is in the inner zone, the binary decision is to change the previous state, whatever it might have been. When slicer 26 has a positive output, the decision is always POSITIVE. When slicer 27 has a negative output, the decision is always NEGATIVE. These decisions are implemented by AND-gates 29, 30 and 31, and flip-flop 28. AND-gate 29 has an input connected to slicer 26 and an output connected to the SET input of flip-flop 28. AND-gate 31 has an input connected through an inhibitor to slicer 27. The inhibitor is required because the output of slicer 27, and hence the input to AND-gate 31, is negative when the amplitude of waveform 16 is in the lower outer zone. Since an output from AND-gate 31 is desired with this negative input, the input is first put through an inhibitor. The output of AND-gate 31 is connected to the RESET input of flip-flop 28. AND-gate 30 has an input connected through an inhibitor to slicer 26 and an input connected to slicer 27. The output of AND-gate 30 is connected to the COMPLEMENT input of flip-flop 28.

When the slicers determine that waveform 16 is in the inner zone, only AND-gate 30 will have an output, thereby causing flip-flop 28 to change state by actuating its COMPLEMENT input. When slicer 26 has a positive output, only AND-gate 29 has an output, and flip-flop 28 is SET. When slicer 27 has a negative output, only AND-gate 31 has an output, and flip-flop 28 is RESET. The waveform of the output of flip-flop 28 is identical to waveform 14. All of the AND-gates have inputs connected to a pulse synchronizing means, such as a clock pulse generator.

The remaining part of the data reconstructor shown in FIG. 6 between the output of flip-flop 28 and the output of the data reconstructor is used to reconvert the digitally differentiated waveform 14 (FIG. 4) to the original data waveform 13. Flip-flop 32 provides a digital one-bit delay; the present bit appears at 33 and the previous bit at 34. These two bits are compared in an EXCLUSIVE-OR circuit consisting of AND-gates 35 and 36, and OR-gate 37. The binary decision based on the EXCLUSIVE-OR circuit is made by flip-flop 38 and AND-gate 39. The input of flip-flop 32 is connected to the output of flip-flop 28. AND-gate 35 has one input connected through an inhibitor to the output of flip-flop 32. It has another input connected to the output of flip-flop 28. Its output is connected to OR-gate 37. AND-gate 36 has an input connected to the output of flip-flop 32 and another input connected through an inhibitor to the output of flip-flop 28. Its output is also connected to the input of OR-gate 37. The output of OR-gate 37 is connected to the SET input of flip-flop 38. AND-gate 39 has an input connected through an inhibitor to the output of OR-gate 37. Its output is connected to the RESET input of flip-flop 38. All of the AND-gates have an input connected to a conventional clock pulse generator 40 to synchronize the pulses with the data source.

When flip-flop 38 and flip-flop 32 are both in the same binary state (the polarities of the present and previous pulses are the same), neither AND-gate 35 nor AND-gate 36 will have an output. Therefore OR-gate 37 has no output. This means AND-gate 39 will have an output (because the output of OR-gate 37 is connected to AND-gate 39 through an inhibitor), and flip-flop 38 will be RESET. This indicates a SPACE. When the outputs of flip-flops 28 and 32 are different, then one or the other of AND-gates 35 and 36 will have an output and therefore so will OR-gate 37. In this case, flip-flop 38 is SET, indicating a MARK.

This system has a one-bit memory. It has therefore a slightly higher error rate than the system shown in FIG. 5 which has no memory. However, when compared to a prior art quaternary system (having the same maximum bit speed), the system of this embodiment is far superior.

Figure 7:
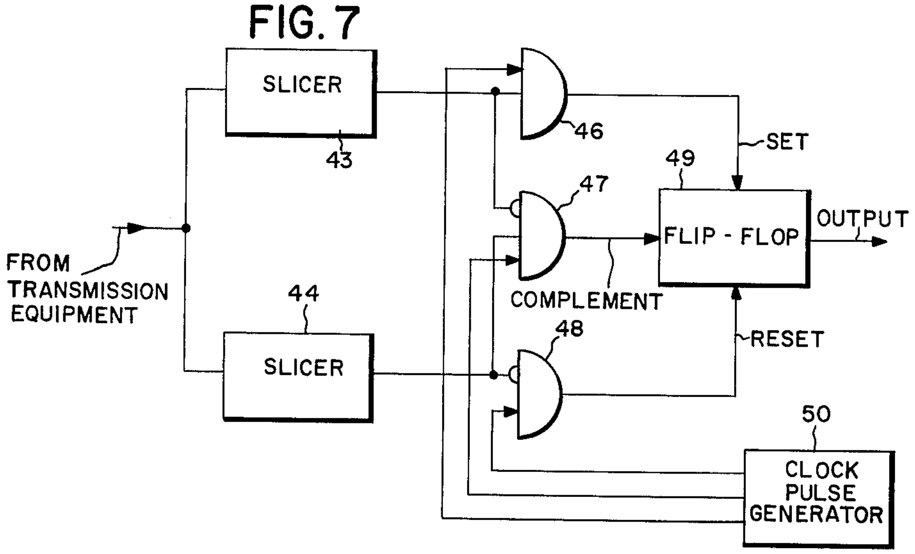
FIG. 7 is a block diagram of a data detector and reconstructor of still another embodiment of the invention.
Figure 8:
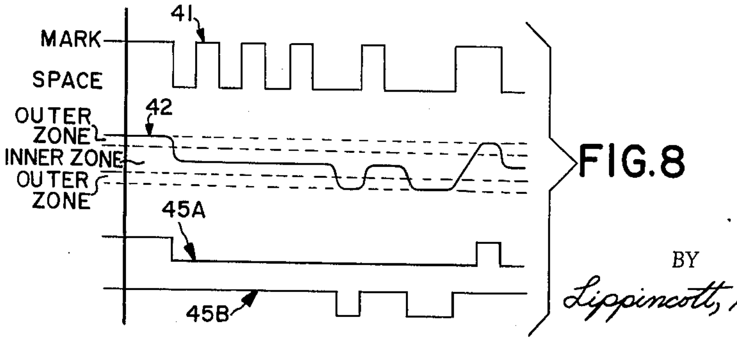
FIG. 8 shows a binary data waveform in various stages of transmission using the embodiment of the invention shown in FIG. 7.

Another embodiment of the data detector and reconstructor of the invention is shown in FIG. 7. In this embodiment, the input data is not digitally differentiated before transmission. Therefore the transmitted data is waveform 41 shown in FIG. 8. The received data from the transmission equipment is waveform 42. The amplitude zones are determined as explained above. This data passes through slicers 43 and 44 (FIG. 7) and then appears as waveforms 45A and 45B (FIG. 8). When the slicers indicate the amplitude of waveform 42 lies in the inner zone, the decision is to change the binary state, whatever it might have been (MARK or SPACE). When slicer 43 has a positive output, the decision is MARK; when slicer 44 has a negative output, the decision is SPACE. These decisions are implemented by the operation of gates 46, 47 and 48, and flip-flop 49.

An input to AND-gate 46 is connected to slicer 43; its output is connected to the SET input of flip-flop 49. An input to AND-gate 48 is connected to slicer 44; its output is connected to the RESET input of flip-flop 49. AND-gate 47 has one input connected to slicer 44 and another input connected through an inhibitor to slicer 43; its output is connected to the COMPLEMENT input of flip-flop 49. All three AND-gates have an input connected to a conventional clock pulse generator 50.

When the slicers indicate the amplitude of waveform 42 is in the inner zone, neither AND-gate 46 nor AND-gate 48 has an output; therefore AND-gate 47 does have an output. The state of flip-flop 49 is then changed. When slicer 43 has a positive output, AND-gate 46 has an output, and the flip-flop is SET, indicating MARK; when slicer 44 has a negative output, AND-gate 48 has an output, and the flip-flop is RESET, indicating SPACE.

This embodiment again has a memory. For that reason, it is also less desirable than the preferred embodiment, but again is superior to the prior-art quaternary system.

The substantial advantages provided by the apparatus of this invention, particularly the preferred embodiment shown in FIG. 5, will be apparent from the following comparative example.

*Example*

A system having the data detector and reconstructor shown in FIG. 5 was compared with a conventional quaternary data communication system, both using an optimized FM transmission apparatus shown in FIG. 2. The system of the present invention was keyed in a binary manner to produce frequencies $f_1$ and $f_2$ which were applied to the bandpass filter. Although no carrier frequency was actually generated in the equipment, at the filter output there actually appeared the frequencies $f_1$ and $f_2$ and a carrier frequency $$f_c=\frac{f_1+f_2}{2}$$

Both systems were designed for a parallel 16-channel application for a total of 2,560 bits per second over high-frequency radio voice channels. All channels had identical bandwidths. The tests were conducted with only a single channel. The parameters of this channel were as follows (for both the system of this invention and the prior-art quaternary system):

| | |
|---|---|
| Bit speed | 160 bits/second. |
| Center frequency | 2125 c.p.s. |
| Shift frequencies | 2085 c.p.s. and 2165 c.p.s. |
| Channel bandwidth | 100 c.p.s. |
| Thermal noise | Flat. |

A standard was established at an error rate of $10^{-6}$. This means that there will be an average of one error in $10^6$ transmitted pulses. The noise of each system was increased until this error rate was reached. The normalized signal-to-noise ratio was then calculated. This is the signal power for one bit per second capacity divided by receiver noise power in a one-cycle band (in decibels). With the system of the invention it was reached at a normalized signal-to-noise ratio of about 16.7 db; with the prior-art quaternary system, it was reached at about 20.5 db. Thus about a 4 db decrease in noise sensitivity was achieved by the system of this invention.

As will be obvious to one skilled in the art, many modifications and variations can be made in the system disclosed above which are still within the spirit and scope of the invention. Therefore the only limitations to be placed on the scope of the invention are those expressed in the following claims.

What is claimed is:

1. Apparatus for the transmission of binary data over a transmission channel of limited frequency bandwidth, which comprises:

means for supplying to the transmission channel electric pulses representing binary data to be transmitted at a bit rate up to about four times the frequency bandwidth limit of said channel, whereby an electric signal is received having three detectable amplitude zones consisting of an inner zone and two outer zones, the maximum change in amplitude of said received signal during a one-bit interval being from one of said three zones to an adjacent one of said three zones, detecting means for determining the amplitude zone within which the amplitude of said received signal lies, and means for reconstructing said electric pulses from the output of said detecting means.

2. The apparatus of claim 1 wherein the output of said reconstructing means is a signal alternately representing opposite binary states when said detecting means indicates that the amplitude of the received signal is in said inner amplitude zone; the output of said reconstructing means is a signal representing one binary state when said detecting means indicates that the amplitude of the received signal is in one of said two outer amplitude zones; and the output of said reconstructing means is a signal representing the other binary state when said detecting means indicates that the amplitude of the received signal is in the other of said two outer amplitude zones.

3. The apparatus of claim 1 wherein said detecting means includes a pair of slicers.

4. The apparatus of claim 3 wherein said reconstructing means includes:

a first AND-gate having an input connected to one of said pair of slicers, and an output connected to the SET input of a flip-flop, a second AND-gate having an input connected through an inhibitor to the other of said pair of slicers and an output connected to the RESET input of said flip-flop, and a third AND-gate having an input connected through an inhibitor to said one of said pair of slicers, an input connected to said other of said pair of slicers, and an output connected to the COMPLEMENT input of said flip-flop.

5. Apparatus for the transmission of binary data over a transmission channel of limited frequency bandwidth, which comprises:

means for supplying to the transmission channel electric pulses representing binary data to be transmitted at a bit rate up to about four times the frequency bandwidth limit of said channel, means for digitally differentiating said electric pulses before transmission, whereby an electric signal is received having three detectable amplitude zones consisting of an inner zone and two outer zones, the maximum change in amplitude of said received signal during a one-bit interval being from one of said three amplitude zones to an adjacent one of said three zones, detecting means for determining within which amplitude zone the amplitude of said received signal lies, and means for reconstructing said electric pulses from the output of said detecting means.

6. Apparatus of claim 5 wherein said detecting means includes a pair of slicers.

7. Apparatus of claim 6 wherein said reconstructing means has two parts, the first part reconstructing a signal representing the digitally differentiated signal and the second part reconstructing the signal representing the original data from the output of the first part.

8. Apparatus of claim 7 wherein the output of said first part is a signal alternately representing opposite binary states when said detecting means indicates that the amplitude of the received signal is within said inner amplitude zone; the output of said first part is a signal representing one binary state when said detecting means indicates that the amplitude of the received signal is within one of said two outer amplitude zones; and the output of said first part is a signal representing the other binary state when said detecting means indicates that the amplitude of the received signal is within the other of said two outer amplitude zones.

9. Apparatus of claim 8 wherein the output of said second part is a signal indicating one binary state when the output of the first part is a signal indicating the opposite binary state from the previous signal; and the output of said second part is a signal indicating the other binary state when the output of the first part is a signal indicating the same binary state as the previous signal.

10. Apparatus of claim 7 wherein said first part of said reconstructing means includes:

a first AND-gate having an input connected to one of said pair of slicers and an output connected to the SET input of a first flip-flop;

a second AND-gate having one input connected through an inhibitor to said one of said pair of slicers, a second input connected to the other of said pair of slicers, and an output connected to the COMPLEMENT input of said first flip-flop; and a third AND-gate having an input connected through an inhibitor to said other of said pair of slicers and an output connected to the RESET input of said first flip-flop, all of said AND-gates having an input connected to a pulse synchronizing means.

11. Apparatus of claim 10 wherein the second part of said reconstructing means includes:

a second flip-flop having an input connected to the output of said first flip-flop;

a fourth AND-gate having an input connected through an inhibitor to the output of said second flip-flop, an input connected to the output of said first flip-flop, and an input connected to a pulse synchronizing means;

a fifth AND-gate having an input connected to the output of said second flip-flop, an input connected through an inhibitor to the output of said first flip-flop and an input connected to said pulse synchronizing means;

an OR-gate having an input connected to the outputs of each of said fourth and said fifth AND-gates and an output connected to the SET input of a third flip-flop; and a sixth AND-gate having an input connected through an inhibitor to the output of said OR-gate, an input connected to said pulse synchronizing means, and an output connected to the RESET input of said third flip-flop.

12. Apparatus for the transmission of binary data over a transmission channel of limited frequency bandwidth, which comprises:

means for supplying to the transmission channel electric pulses representing binary data to be transmitted at a bit rate up to about four times the frequency bandwidth limit of said channel, means for digitally differentiating said electric pulses before transmission, whereby an electric signal is received having three detectable amplitude zones consisting of an inner zone and two outer zones, the maximum change in amplitude of said received signal during a one-bit interval being from one of said three amplitude zones to an adjacent one of said three zones.

detecting means receiving the output of said transmission channel and determining the amplitude zone within which the received signal lies, and means for reconstructing said electric pulses from the output of said detecting means.

13. Apparatus of claim 12 wherein said detecting means includes a pair of slicers.

14. Apparatus of claim 13 wherein said reconstructing means includes:

a first AND-gate having a first input connected to one of said pair of slicers, a second input connected through an inhibitor to the other of said pair of slicers, and an output connected to the SET input of a flip-flop;

a second AND-gate having an input connected through an inhibitor to the output of said first AND-gate and an output connected to the RESET input of said flip-flop;

both of said AND-gates having an input connected to a pulse synchronizing means.

References Cited by the Examiner

UNITED STATES PATENTS

| | | | |
|---|---|---|---|
| 1,233,519 | 7/1917 | Squier | 178—67 |
| 2,912,684 | 11/1959 | Steele | 178—67 X |
| 3,162,724 | 12/1964 | Ringelhaan | 178—68 |

DAVID G. REDINBAUGH, *Primary Examiner.*

J. P. MOHN, S. J. GLASSMAN, *Assistant Examiners.*